US012391104B2

(12) United States Patent
Hirase et al.

(10) Patent No.: US 12,391,104 B2
(45) Date of Patent: Aug. 19, 2025

(54) WORK VEHICLE

(71) Applicant: KUBOTA CORPORATION, Osaka (JP)

(72) Inventors: Yuji Hirase, Osaka (JP); Sumio Yagyu, Osaka (JP); Kazuto Okazaki, Osaka (JP); Tsunehiro Il, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 332 days.

(21) Appl. No.: 18/129,582

(22) Filed: Mar. 31, 2023

(65) Prior Publication Data
US 2023/0391176 A1 Dec. 7, 2023

(30) Foreign Application Priority Data

Jun. 3, 2022 (JP) .................................. 2022-090762

(51) Int. Cl.
B60K 1/02 (2006.01)

(52) U.S. Cl.
CPC ........... B60K 1/02 (2013.01); B60Y 2200/221 (2013.01)

(58) Field of Classification Search
CPC .......... B62D 33/0617; B62D 33/0604; B62D 49/06; B60L 50/66; B60H 1/00278; B60H 1/00564; B60K 1/02; B60K 11/02; B60K 11/04; B60K 6/40; H02K 9/19; H05K 7/20927; F01P 3/12; F01P 3/20
See application file for complete search history.

(56) References Cited

U.S. PATENT DOCUMENTS

| | | | | |
|---|---|---|---|---|
| 9,045,028 B2* | 6/2015 | Ichikawa | ................... | B60L 1/08 |
| 9,482,321 B2* | 11/2016 | Park | ....................... | B60K 6/445 |
| 10,232,699 B2* | 3/2019 | Oyama | .................... | B60K 6/26 |
| 10,272,774 B2* | 4/2019 | Hashimoto | ............ | B60K 23/08 |
| 10,960,752 B2* | 3/2021 | Takeno | .................... | B60K 1/00 |
| 12,240,289 B2* | 3/2025 | Eser | .................... | B60H 1/00278 |
| 2012/0186391 A1* | 7/2012 | Boskovitch | .............. | B60K 6/46 |
| | | | | 180/65.245 |
| 2013/0168166 A1 | 7/2013 | Konz et al. | | |
| 2015/0303660 A1 | 10/2015 | Sakamoto | | |
| 2017/0174069 A1 | 6/2017 | Oyama et al. | | |

FOREIGN PATENT DOCUMENTS

| | | |
|---|---|---|
| JP | 2014-65349 A | 4/2014 |
| JP | 2015-051757 A | 3/2015 |
| JP | 2015-205596 A | 11/2015 |
| WO | 2010/151775 A1 | 12/2010 |
| WO | 2021/121604 A1 | 6/2021 |

OTHER PUBLICATIONS

European Search Report issued Oct. 30, 2023 in European family member application No. 23167202.3.

* cited by examiner

Primary Examiner — John D Walters
(74) Attorney, Agent, or Firm — GREENBLUM AND BERNSTEIN, P.L.C.

(57) ABSTRACT

A work vehicle includes: a front wheel; a rear travel device; a travel body supported by the front wheel and the rear travel device; a driving section provided in the travel body and having an occupant floor section; a travel power transmission device configured to transmit power to the rear travel device; at least one electric motor coupled to the travel power transmission device; a first inverter connected to the at least one electric motor; and a second inverter connected to the at least one electric motor.

6 Claims, 5 Drawing Sheets

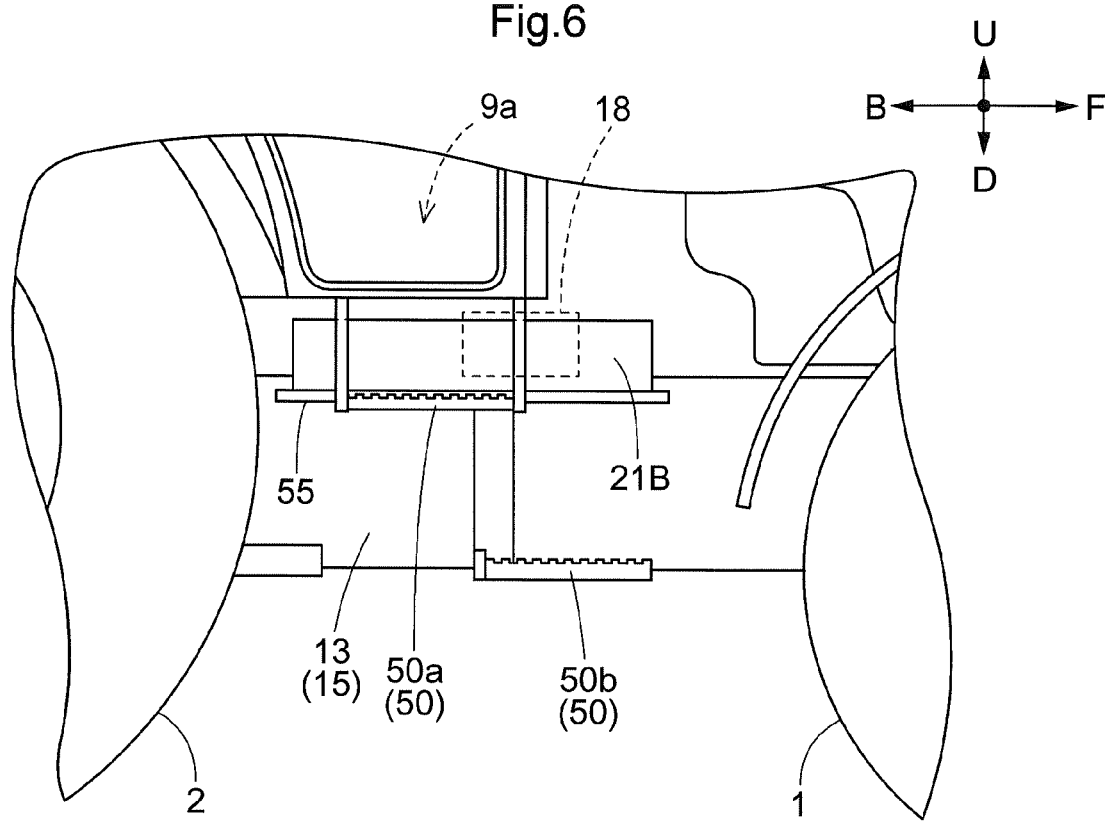

WORK VEHICLE

BACKGROUND OF THE INVENTION

1. Field of the Invention

The present invention relates to work vehicles provided with a travel body that is supported by front wheels and a rear travel device, and includes a driving section having an occupant floor section.

2. Description of the Related Art

Such work vehicles include those provided with a travel power transmission device (continuously variable transmission, forward-reverse switching device, gear transmission) that transmits power to the rear travel device (rear wheels), and an electric motor (motor generator) coupled to the travel power transmission device, as shown in the JP 2014-65349A.

SUMMARY OF THE INVENTION

Such work vehicles are generally equipped with an inverter that is connected to the electric motor, and require easy maintenance of the inverter.

The present invention provides a work vehicle in which an inverter can be provided in such a manner as to facilitate maintenance while increasing the minimum ground height of the inverter without increasing the ground height of the floor section.

A work vehicle according to the present invention comprising:
a front wheel;
a rear travel device;
a travel body supported by the front wheel and the rear travel device;
a driving section provided in the travel body and having an occupant floor section;
a travel power transmission device configured to transmit power to the rear travel device;
at least one electric motor coupled to the travel power transmission device;
a first inverter connected to the at least one electric motor; and
a second inverter connected to the at least one electric motor;
wherein:
the first inverter is provided between the front wheel and the rear travel device, on a first side in a width direction of a vehicle body of the work vehicle relative to the travel power transmission device within a space downward of the floor section, and
the second inverter is provided between the front wheel and the rear travel device, on a second side in the width direction of the vehicle body relative to the travel power transmission device within the space downward of the floor section.

According to this configuration, maintenance on the inverter can be performed via the region between the front wheel and the rear travel device from laterally outward of the vehicle body. Two inverters are employed, thus enabling the up-down length of each inverter to be shortened while obtaining the necessary power exchange function, compared with the case where one inverter is employed. The inverters having short up-down lengths are provided one on either side of the travel power transmission device downward of the floor section, thus enabling the minimum ground height of the inverters to be increased without increasing the ground height of the floor section, compared with the case where one invertor having a long up-down length is provided downward of the floor section.

In other words, the inverters can be provided in such a manner as to facilitate maintenance, while increasing the minimum ground height of the inverters without increasing the ground height of the floor section.

Also, inverters that are used in work vehicles tend to be large in size in order to support high power, but dividing the inverter in two opens up the possibility of reducing the overall size. Also, the degree of freedom in terms of layout can be enhanced.

In the present invention, it is preferable that the travel power transmission device includes a transmission case and a transmission provided inside the transmission case.

According to this configuration, the drive speed of the rear travel device can be changed by the transmission, thus enabling the work vehicle to travel at a speed corresponding to the work being performed even in the case of performing various different work.

In the present invention, it is preferable that the at least one electric motor includes a first electric motor and a second electric motor, the first electric motor is connected to the first inverter, and the second electric motor is connected to the second inverter.

According to this configuration, it is easy to ensure that the connection structure connecting one electric motor and one inverter does not intersect the connection structure connecting the other electric motor and the other inverter.

In the present invention, it is preferable that the at least one electric motor includes a first electric motor and a second electric motor, and the first electric motor and the second electric motor are provided inside the transmission case, with the first electric motor, the second electric motor, the first inverter and the second inverter located at positions corresponding to each other in a front-rear direction of the vehicle body.

According to this configuration, the inverters are located near the respective electric motors, thus facilitating the connection of the inverters to the respective electric motors.

In the present invention, it is preferable that the first electric motor and the second electric motor are arranged laterally to each other in the width direction of the vehicle body.

According to this configuration, the inverters on both sides of the transmission case are near the respective electric motors, thus facilitating connection of the inverters to the respective electric motors.

In the present invention, it is preferable that the work vehicle further includes a first support member spanning from the first inverter to the transmission case and supporting the first inverter, and a second support member spanning from the second inverter to the transmission case and supporting the second inverter.

According to this configuration, the first inverter and the second inverter are supported by the highly rigid transmission case respectively via the first support member and the second support member, thus enabling the first and second inverters to be firmly supported so as to minimize any looseness.

BRIEF DESCRIPTION OF THE DRAWINGS

FIG. 6 is a side view showing installation of an inverter on the right side of the vehicle body.

DETAILED DESCRIPTION OF THE PREFERRED EMBODIMENTS

Hereinafter, an example embodiment of the present invention will be described with reference to the drawings.

Note that, in the following description, in relation to the travel body of a tractor (example of "work vehicle"), the direction of the F arrow in FIGS. 1, 2 and the like indicates "vehicle body front", the direction of the B arrow in FIGS. 1, 2 and the like indicates "vehicle body back", the direction of the U arrow in FIGS. 1, 2 and the like indicates "vehicle body up", and the direction of the D arrow in FIGS. 1, 2 and the like indicates "vehicle body down". The near side in FIG. 1, the far side in FIG. 2, and the direction of the L arrow in FIG. 4 indicate "vehicle body left", and the far side in FIG. 1, the near side in FIG. 2, and the direction of the R arrow in FIG. 4 indicate "vehicle body right". The left-right direction of the vehicle body is the width direction of the vehicle body.

Overall Configuration of Tractor

Figure 1:
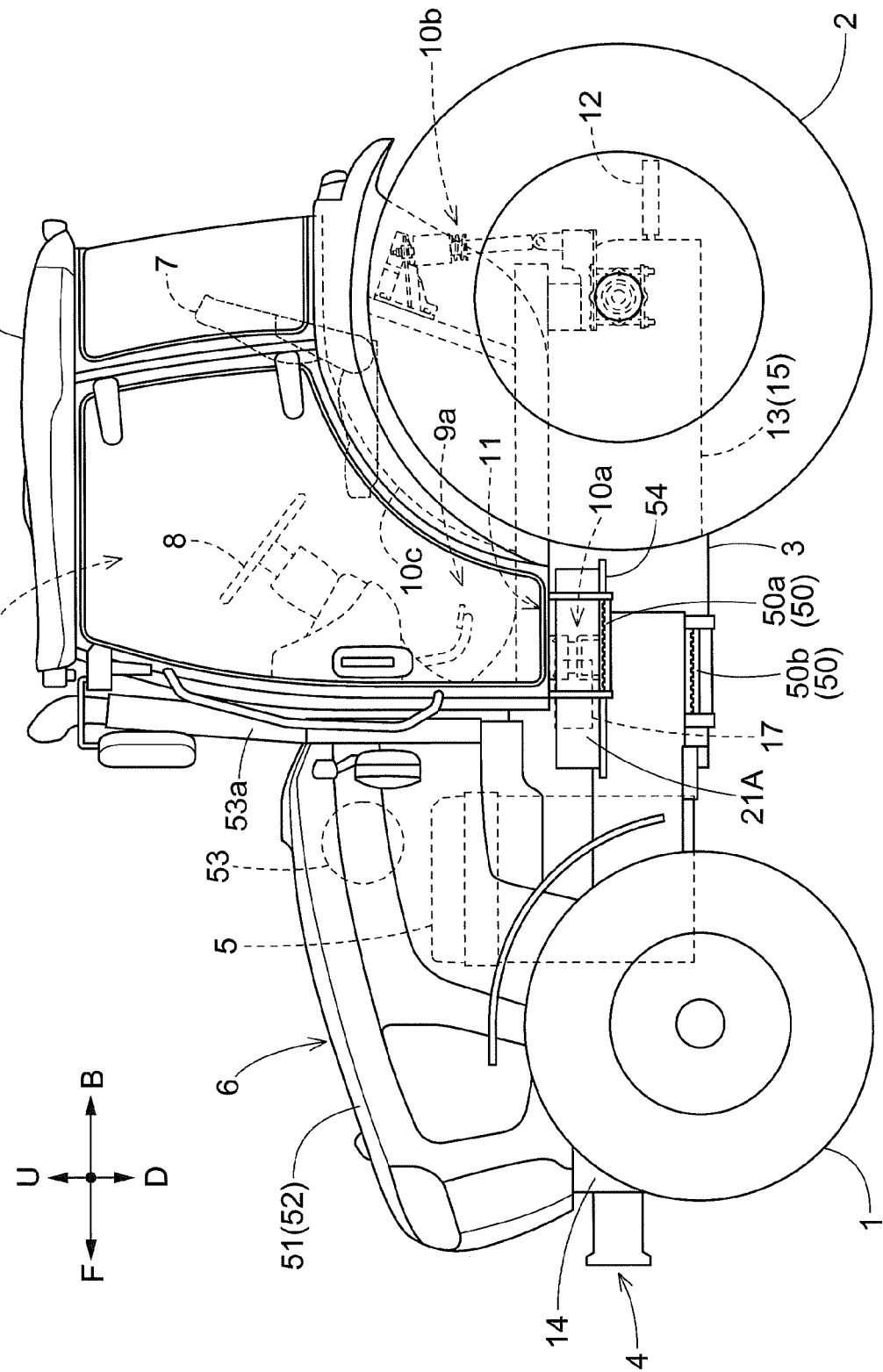
FIG. 1 is a side view showing the left side of a tractor.
Figure 2:
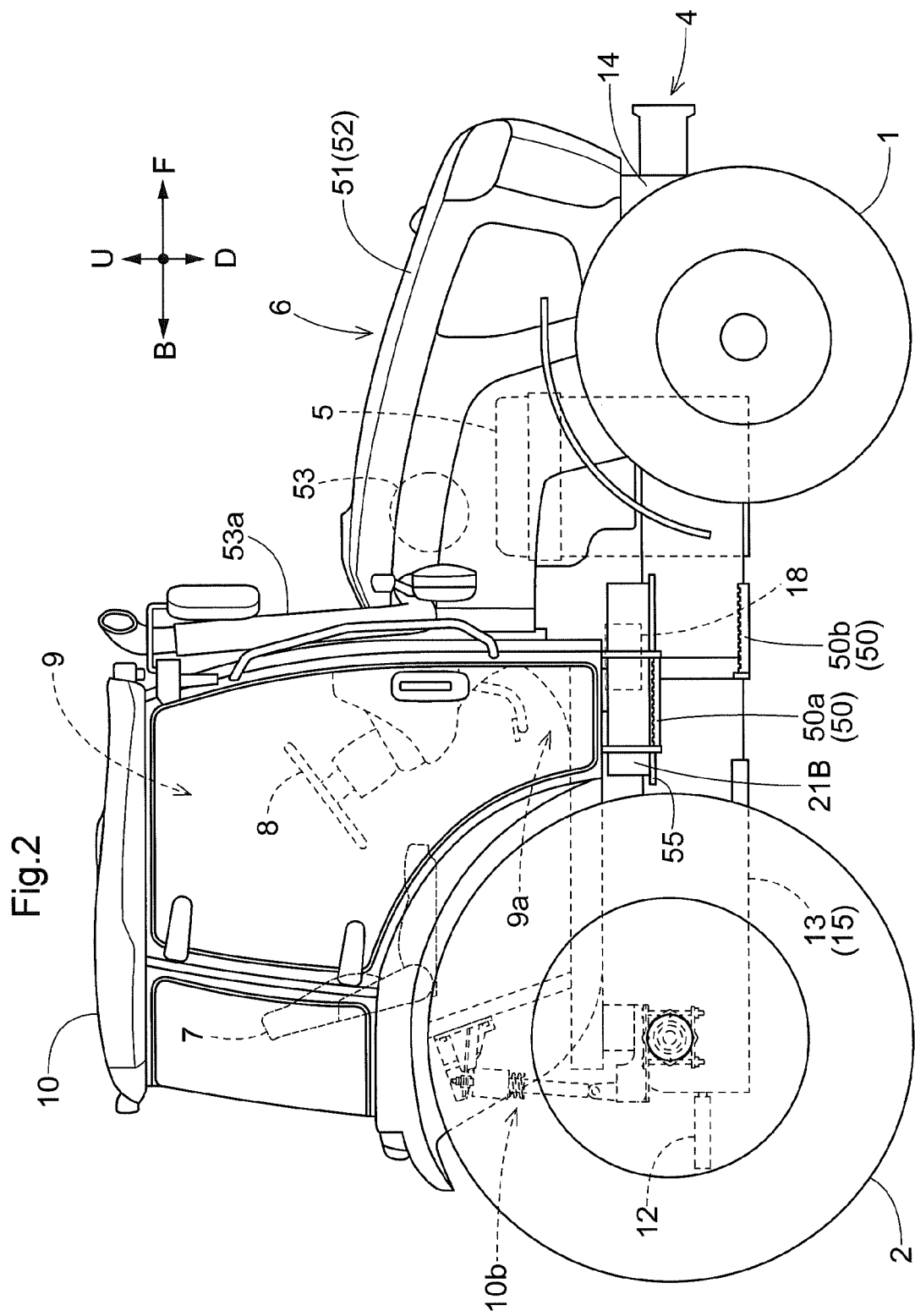
FIG. 2 is a side view showing the right side of the tractor.

As shown in FIGS. 1 and 2, the tractor includes a travel body 3 supported by a pair of left and right drivable front wheels 1 and a pair of left and right drivable rear wheels 2 serving as a rear travel device. The travel body 3 includes a vehicle body frame 4 that is constituted by an engine 5 provided in a front portion of the travel body 3, a transmission case 13 coupled at the front to a rear portion of the engine 5, and a front frame 14 coupled to a lower portion of the engine 5. In a front portion of the travel body 3 is provided a motive section 6 having the engine 5. In a rear portion of the vehicle body 3 is provided a driving section 9. In a rear portion of the transmission case 13 are provided a link mechanism (not shown) for coupling work machinery such as a rotary tiller (not shown) in such a manner as to be liftable and lowerable, and a power takeoff shaft 12 that takes power from the engine 5 and transmits power to the coupled work machinery. In the present embodiment, the rear wheels 2 serving as a rear travel device are provided, but a mini crawler type travel device can be employed as the rear travel device.

Driving Section

Figure 4:
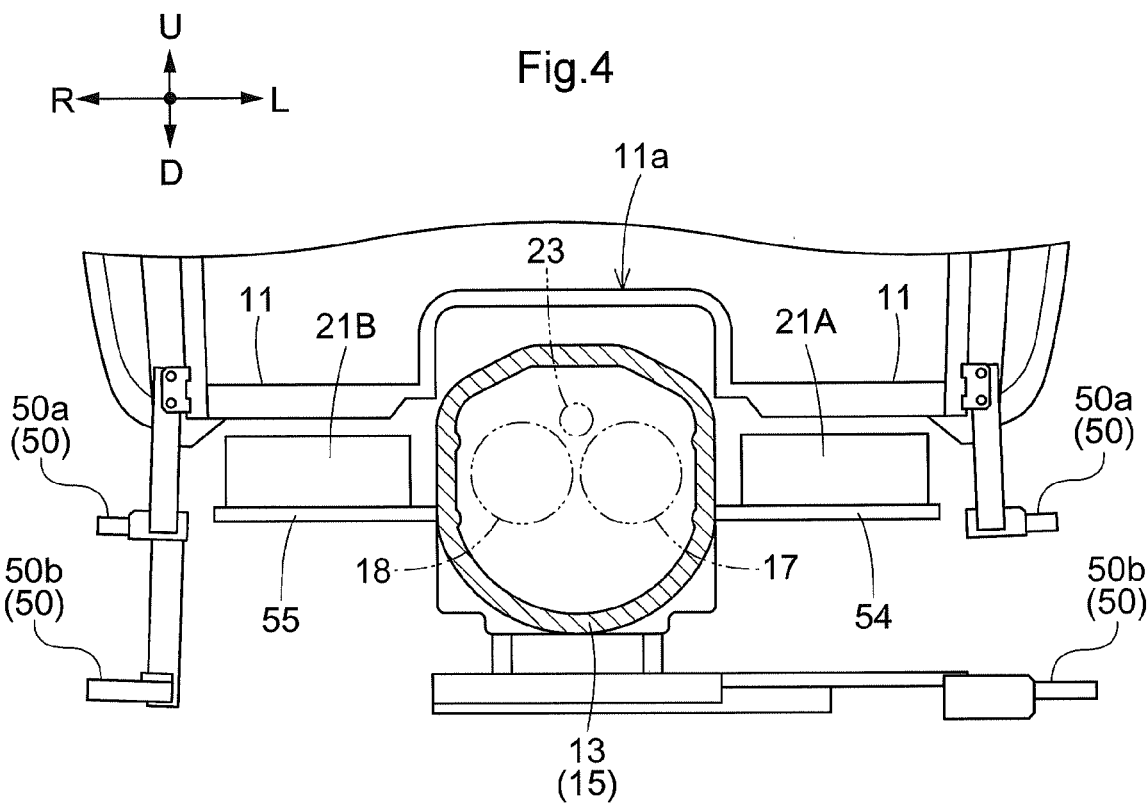
FIG. 4 is a front view showing installation of inverters.
Figure 5:
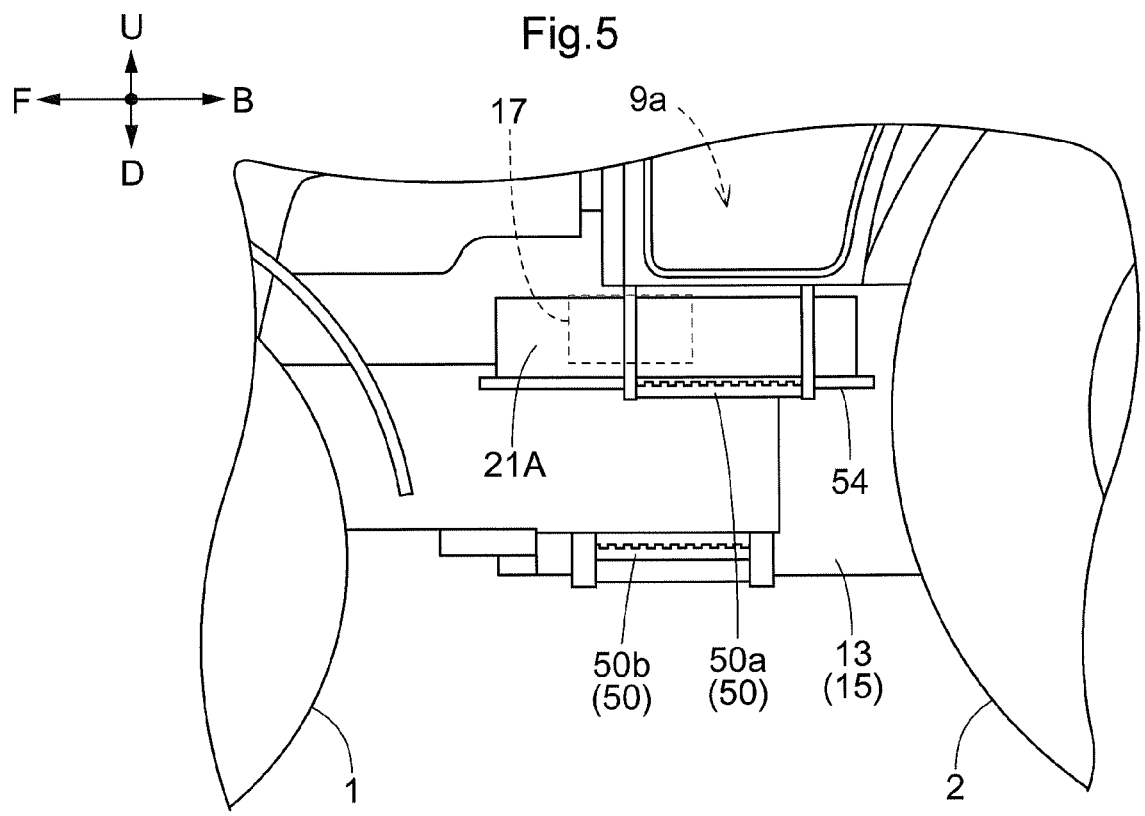
FIG. 5 is a side view showing installation of an inverter on the left side of the vehicle body.

As shown in FIGS. 1 and 2, the driving section 9 includes a driver's seat 7, an occupant floor section 11 (see FIG. 4) provided on the lower front side of the driver's seat 7, a steering wheel 8 for steering the front wheels 1, and a driver's cabin 10 covering the occupant space. The floor section 11 is supported by the driver's cabin 10. As shown in FIG. 4, in a middle portion of the floor section 11 in the width direction of the vehicle body (region located upward of the transmission case 13) is provided an upward protruding section 11a.

The driver's cabin 10 is supported by the vehicle body frame 4 via a front shock absorber 10a (see FIGS. 1, 2) and a rear shock absorber 10b (see FIGS. 1, 2) that mitigate the transmission of travel vibration and the like to the driver's cabin 10. Specifically, the driver's cabin 10 includes a lower frame 10c, and the lower frame 10c is coupled at two (left and right) places of a front portion thereof to a front portion of the transmission case 13 via the front shock absorber 10a, and at two (left and right) places of a rear portion thereof to a rear portion of the transmission case 13 via the rear shock absorber 10b.

As shown in FIGS. 1 and 2, on both the outer right side and outer left side of the driving section 9 is provided a two-step running board 50 having an upper step and a lower step used for getting in and out of the driving section 9. The two-step lower running board includes an upper running board 50a that, in side view of the vehicle body, is located downward of an entrance 9a of the driving section 9, and a lower running board 50b that is positionally shifted to the front side of the vehicle body relative to the upper running board Motive Section As shown in FIGS. 1 and 2, the motive section 6 includes an engine compartment 52 formed by an engine bonnet 51. The engine 5 is provided in a rear portion of the engine compartment 52. Upward of a rear portion of the engine 5 is provided an exhaust gas treatment device 53 for purifying the exhaust of the engine 5. The exhaust gas treatment device 53 performs purification of the exhaust gas by injecting a urea solution serving as a reducing agent supplied from a reducing agent tank (not show) into exhaust gas introduced from the engine 5 to promote hydrolysis, and obtaining exhaust gas containing a reduced amount of nitrogen oxide as a result. The purified exhaust gas is discharged from an exhaust pipe 53a connected to the exhaust gas treatment device 53.

Travel Power Transmission Device

The tractor is provided with a travel power transmission device 15 that transmits power from the engine 5 to the front wheels 1 and the rear wheels 2 and includes the transmission case 13 which is coupled at the front to a rear portion of the engine 5, as shown in FIGS. 1 and 2. The transmission case 13 is aligned with the engine 5 in the front-rear direction of the vehicle body, and extends in the front-rear direction of the vehicle body through a middle portion in the width direction of the vehicle body. The engine 5 and the transmission case 13 are coupled together by coupling a flywheel housing (not shown) provided in a rear portion of the engine 5 and housing a flywheel 5a (see FIG. 3) to a clutch housing (not shown) provided in a front portion of the transmission case 13.

Figure 3:
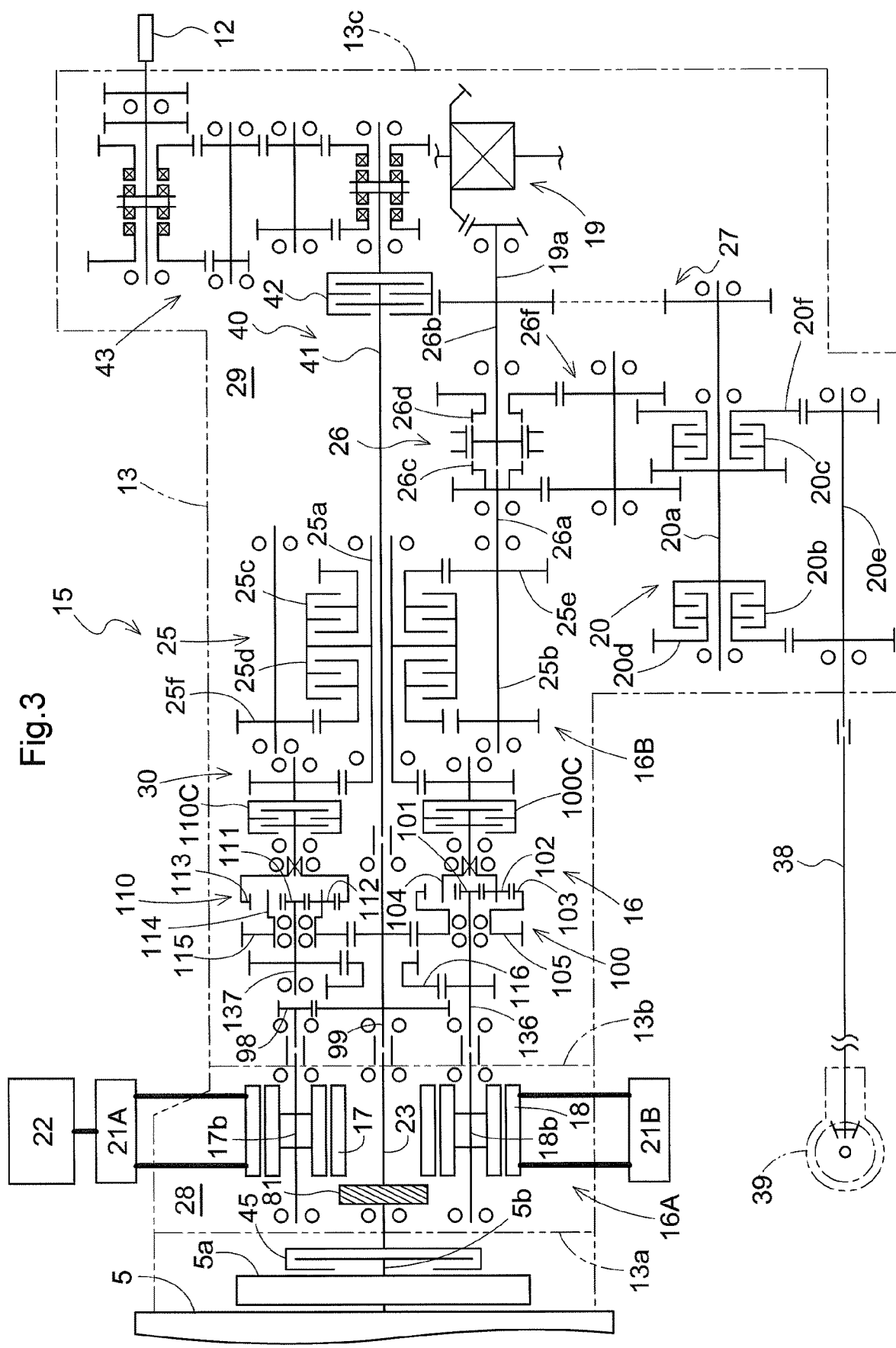
FIG. 3 is a schematic diagram of a travel power transmission device.

As shown in FIG. 3, the transmission case 13 houses a hybrid transmission 16 serving as a transmission that shifts power from the engine 5 and outputs the resultant power to the front wheels 1 and the rear wheels 2.

Hybrid Transmission

The hybrid transmission 16, as shown in FIG. 3, includes an input shaft 23 provided in a front portion of the transmission case 13 and to which the power of the output shaft 5b of the engine 5 is input, an electric transmission section 16A rearwardly adjacent to the engine 5, and a gear transmission section 16B rearward of the electric transmission section 16A. The axis of the input shaft 23 and the axis of the output shaft 5b are located on a common axis.

As shown in FIG. 3, the electric transmission section 16A is housed in an electric transmission compartment 28 formed in a front portion of the transmission case 13. The gear transmission section 16B is housed in a gear transmission compartment 29 formed in a rear portion of the transmission case 13. The electric transmission compartment 28 is formed by a peripheral wall of the transmission case 13, a front wall 13a provided internally in a front end section of the transmission case 13, and an isolating wall 13b provided internally in an intermediate portion of the transmission case 13. The gear transmission compartment 29 is formed by the peripheral wall of the transmission case 13, a rear wall 13c located in a rear end section of the transmission case 13, and the isolating wall 13b. The electric transmission compartment 28 and the gear transmission compartment 29 are adjacent to each other across the isolating wall 13b. The electric transmission compartment 28 and the gear transmission compartment 29 are isolated from each other by the isolating wall 13b so as not to communicate.

Electric Transmission Section

As shown in FIG. 3, the electric transmission section 16A is provided between the engine 5 and the gear transmission section 16B. The electric transmission section 16A includes two motor generators 17 and 18 serving as electric motors. In the present embodiment, as shown in FIG. 4, the two motor generators 17 and 18 are arranged laterally to each other in the width direction of the vehicle body, with the rotation axis of each of the motor generators 17 and 18 lying in the front-rear direction of the vehicle body, and the rotation axes of the two motor generators 17 and 18 being arranged laterally to each other in the width direction of the vehicle body. A motor generator that is long in the front-rear direction of the vehicle body can be employed as each of the motor generators 17 and 18, compared with the case where two motor generators are aligned in the front-rear direction of the vehicle body. In the present embodiment, the two motor generators 17 and 18 are set to corresponding outer diameters. In the present embodiment, the two motor generators 17 and 18 are arranged laterally to each other in the width direction of the vehicle body, but may be aligned in the up-down direction of the vehicle body, or may be arranged diagonally with the motor generator 18 higher than the motor generator 17 or with the motor generator 17 higher than the motor generator 18 as viewed in the front-rear direction of the vehicle body.

Gear Transmission Section

As shown in FIG. 3, the gear transmission section 16B is provided on the opposite side of the electric transmission section 16A to the engine 5. The gear transmission section 16B is rearwardly adjacent to the electric transmission section 16A.

As shown in FIG. 3, the gear transmission section 16B has a gear transmission mechanism 30. The gear transmission mechanism 30 includes a transmission mechanism input shaft 99, a gear transmission mechanism 98, a low speed planetary transmission section 100, a low speed clutch 100C, a high speed planetary transmission section 110, a high speed clutch 110C, a forward-reverse switching device 25, a sub-transmission 26, a rear wheel differential mechanism 19, a front wheel transmission 20, and a gear linkage mechanism 27.

In the following description, the one motor generator 17 out of the two motor generators 17 and 18 will be referred to as a first motor generator 17 (corresponds to first electric motor), and the other motor generator 18 out of the two motor generators 17 and 18 will be referred to a second motor generator 18 (corresponds to second electric motor).

The transmission mechanism input shaft 99 is located rearward of the input shaft 23 of the transmission case 13, and the axis thereof and the axis of the input shaft 23 are located on a common axis. The transmission mechanism input shaft 99 and the input shaft 23 are coupled together, and the power of the input shaft 23 is transmitted to the transmission mechanism input shaft 99. The gear transmission mechanism 9 spans the transmission mechanism input shaft 99 and a rotor support shaft 17b of the first motor generator 17, and is configured to transmit the power of the input shaft 23 to the first motor generator 17.

As shown in FIG. 3, the low speed planetary transmission section 100 includes a sun gear 101, a planetary gear 102, an internal gear 103, and a carrier 104. The low speed planetary transmission section 100 is provided rearward of the second motor generator 18, with the rotation axis of the sun gear 101 and the axis of a rotor support shaft 18b of the second motor generator 18 being located on a common axis. The internal gear 103 and the transmission mechanism input shaft 99 are coupled together via a gear linkage mechanism 105. The sun gear 101 includes a first input shaft 136, and the first input shaft 136 is coupled to the rotor support shaft 18b of the second motor generator 18.

In the low speed planetary transmission section 100, the power of the input shaft 23 is transmitted to the internal gear 103 to drive the internal gear 103, the drive power of the second motor generator 18 is transmitted to the sun gear 101 to drive the sun gear 101, the power from the engine 5 and the drive power of the second motor generator 18 are combined to produce low speed combined power, and the low speed combined power is output from the carrier 104.

The low speed clutch 100C is provided between an output section of the low speed planetary transmission section 100 and an input shaft 25a of the forward-reverse switching device 25, and is configured to transmit the low speed combined power output by the low speed planetary transmission section 100 to the forward-reverse switching device 25 when engaged (on state), and to cut power transmission from the low speed planetary transmission section 100 to the forward-reverse switching device 25 when disengaged (off state).

As shown in FIG. 3, the high speed planetary transmission section 110 includes a sun gear 111, a planetary gear 112, an internal gear 113, and a carrier 114. The high speed planetary transmission section 110 is provided rearward of the first motor generator 17, with the rotation axis of the sun gear 111 and the axis of the rotor support shaft 17b of the first motor generator 17 being located on a common axis. The carrier 114 and the transmission mechanism input shaft 99 are coupled together via a gear linkage mechanism 115. The sun gear 111 includes a second input shaft 137, and the second input shaft 137 and the rotor support shaft 18b of the second motor generator 18 are coupled together via a gear linkage mechanism 116 and the first input shaft 136.

In the high speed planetary transmission section 110, the power of the input shaft 23 is transmitted to the carrier 114 to drive the planetary gear 112, the drive power of the second motor generator 18 is transmitted to the sun gear 111 to drive the sun gear 111, the engine power from the input shaft 23 and the drive power of the second motor generator 18 are combined to produce high speed combined power, and the high speed combined power is output from the internal gear 113. The high speed combined power is higher than the low speed combined power that is produced by the low speed planetary transmission section 100.

The high speed clutch 110C is provided between an output section of the high speed planetary transmission section 110 and the input shaft 25a of the forward-reverse switching device 25, and is configured to transmit the high speed combined power output by the high speed planetary transmission section 110 to the forward-reverse switching device 25 when engaged (on state), and to cut power transmission from the high speed planetary transmission section 110 to the forward-reverse switching device 25 when disengaged (off state).

The forward-reverse switching device 25, as shown in FIG. 3, includes the input shaft 25a rearward of the transmission mechanism input shaft 99, and an output shaft 25b parallel to the input shaft 25a. The axis of the input shaft 25a and the axis of the transmission mechanism input shaft 99 are located on a common axis. Provided on the input shaft 25a are a forward clutch 25c and a reverse clutch 25d. Spanning the forward clutch 25c and the output shaft 25b is a forward gear mechanism 25e. Spanning the reverse clutch 25d and the output shaft 25b is a reverse gear mechanism 25f.

In the forward-reverse switching device 25, the outputs of the low speed clutch 100C and the high speed clutch 110C are input to the input shaft 25a. In response to the forward clutch 25c being engaged, the power of the input shaft 25a is switched to forward power by the forward gear mechanism 25e and the forward clutch 25c, transmitted to the output shaft 25b, and output from the output shaft 25b. In response to the reverse clutch being engaged, the power of the input shaft 25a is switched to reverse power by the reverse gear mechanism 25f and the reverse clutch 25d, transmitted to the output shaft 25b, and output from the output shaft 25b.

The sub-transmission 26, as shown in FIG. 3, includes an input shaft 26a coupled to the output shaft 25b of the forward-reverse switching device 25 and the output shaft 26b rearward of the input shaft 26a. The axis of the input shaft 26a and the axis of the output shaft 26b are located on a common axis. Provided between a rear portion of the input shaft 26a and a front portion of the output shaft 26b is a high speed clutch 26c. Spanning the input shaft 26a and a rear portion of the output shaft 26b are a low speed gear mechanism 26f and a low speed clutch 26d.

In the sub-transmission 26, the output of the forward-reverse switching device 25 is input to the input shaft 26a. In response to the high speed clutch 26c being engaged, the power of the input shaft 26a is transmitted to the output shaft 26b without being shifted via the high speed clutch 26c, and the high speed power is output from the output shaft 26b. In response to the low speed clutch 26d being engaged, the power of the input shaft 26a is shifted to low speed power by the low speed gear mechanism 26f and the low speed clutch 26d, transmitted to the output shaft 26b, and output from the output shaft 26b. The low speed power is lower than the high speed power output in response to the high speed clutch 26c being engaged.

As shown in FIG. 3, the rear wheel differential mechanism 19 includes an input shaft 19a to which the output of the sub-transmission 26 is input. The input shaft 19a is coupled to a rear portion of the output shaft 26b of the sub-transmission 26. The gear linkage mechanism 27 spans the output shaft 26b of the sub-transmission 26 and the input shaft 20a of the front wheel transmission 20, and is configured to transmit the power of the output shaft 26b of the sub-transmission 26 to the input shaft 20a of the front wheel transmission 20.

The front wheel transmission 20, as shown in FIG. 3, includes an input shaft 20a coupled to the gear linkage mechanism 27 and an output shaft 20e parallel to the input shaft Provided on the input shaft 20a are a constant speed clutch 20b and an acceleration clutch 20c. Spanning the constant speed clutch 20b and the output shaft 20e is a constant speed gear mechanism 20d. Spanning the acceleration clutch 20c and the output shaft 20e is an acceleration gear mechanism 20f.

In the front wheel transmission 20, the output of the sub-transmission 26 is transmitted to the input shaft 20a by the gear linkage mechanism 27. In response to the constant speed clutch 20b being engaged, the power of the input shaft 20a is shifted to constant speed power by the constant speed clutch 20b and the constant speed gear mechanism 20d, transmitted to the output shaft 20e, and output from the output shaft 20e. The constant speed power drives the front wheels 1 at a speed corresponding to the speed of the rear wheels 2. In response to the acceleration clutch 20c being engaged, the power of the input shaft 20a is shifted to acceleration power by the acceleration clutch 20c and the acceleration gear mechanism 20f, transmitted to the output shaft 20e, and output from the output shaft 20e. The acceleration power drives the front wheels 1 at a higher speed than the rear wheels 2. The power of the output shaft 20e of the front wheel transmission 20 is transmitted to the front wheel differential mechanism 39 via a rotation shaft 38.

In the travel power transmission device 15, when driving the front wheels 1 and the rear wheels 2, the power of the engine 5 and the drive power of the second motor generator 18 are transmitted to the front wheels 1 and the rear wheels 2.

That is, the power (engine power) from the engine 5 transmitted to the input shaft 23 and the drive power (motor power) of the second motor generator 18 are combined to produce low speed combined power by the low speed planetary transmission section 100. The power (engine power) from the engine 5 transmitted to the input shaft 23 and the drive power (motor power) of the second motor generator 18 are combined to produce high speed combined power by the high speed planetary transmission section 110. By engaging the low speed clutch 100C and disengaging the high speed clutch 110C, the low speed combined power from the low speed planetary transmission section 100 is transmitted to the input shaft 25a of the forward-reverse switching device 25 and from the output shaft of the forward-reverse switching device 25 to the sub-transmission 26, and is then transmitted from the sub-transmission 26 to the rear wheel differential mechanism 19 and the front wheel transmission 20 via the gear linkage mechanism 27. By engaging the high speed clutch 110C and disengaging the low speed clutch 100C, the high speed combined power from the high speed planetary transmission section 110 is transmitted to the input shaft 25a of the forward-reverse switching device 25 and from the output shaft 25b of the forward-reverse switching device 25 to the sub-transmission 26, and is then transmitted from the sub-transmission 26 to the rear wheel differential mechanism 19 and the front wheel transmission 20.

In the travel power transmission device 15, when driving the front wheels 1 and the rear wheels 2, the power from the engine 5 transmitted to the input shaft 23 is input to the first motor generator 17 via the transmission mechanism input shaft 99 and the gear transmission mechanism 98, the first motor generator 17 is driven and generates power, and the generated power can be supplied for use in driving to the second motor generator 18. Power supply to the second motor generator 18 is performed by charging a battery 22 with the generated power and supplying power via the battery 22, or is performed without charging the battery 22 with the generated power and supplying power via the battery 22.

Spanning the output shaft 5b and the input shaft 23 is a clutch 45, as shown in FIG. 3. The clutch 45 is configured to be switched between engaged (on state) and disengaged (off state) by a hydraulic solenoid valve or the like. Due to being engaged, the clutch 45 transmits the power from the engine 5 to the electric transmission section 16A and the gear transmission section 16B, drives the front wheels 1 and the rear wheels 2 with the power of the engine 5 and the drive power of the second motor generator 18, and switches the hybrid transmission 16 to a hybrid mode in which power is generated by the first motor generator 17. Due to being disengaged, the clutch 45 cuts power transmission from the engine 5 to the electric transmission section 16A and the gear transmission section 16B, and switches the hybrid transmission 16 to an electric mode in which the front wheels 1 and the rear wheels 2 are driven by only the drive power of the second motor generator 18. A dry clutch can be employed as the clutch 45.

Provided on the input shaft 23 is a trochoid pump 81 that supplies lubricating oil to the first motor generator 17, the second motor generator 18, and the gear transmission mechanism 30, as shown in FIG. 3.

Work Power Transmission Device

As shown in FIGS. 1 and 2, the power takeoff shaft 12 is supported by a rear portion of the transmission case 13. As shown in FIG. 3, the transmission case 13 houses a work power transmission device 40 that transmits the power of the engine 5 to the power takeoff shaft 12.

The work power transmission device 40, as shown in FIG. 3, includes the transmission mechanism input shaft 99 coupled to the input shaft 23, a rotation shaft 41 that extends in the front-rear direction of the vehicle body rearward of the transmission mechanism input shaft 99 and is coupled at the front to a rear portion of the transmission mechanism input shaft 99, a work clutch 42 that is coupled to a rear portion of the rotation shaft 41, and a power takeoff shaft transmission 43 that shifts the output of the work clutch 42 and transmits the resultant output to the power takeoff shaft 12. The axis of the rotation shaft 41 and the axis of the input shaft 23 are located on a common axis. The input shaft 23 and the rotation shaft 41 are linked directly or via a joint.

In the work power transmission device 40, the power of the input shaft 23 is transmitted to the rotation shaft 41, and is transmitted from the rotation shaft 41 to the power takeoff shaft 12 via the work clutch 42 and the power takeoff shaft transmission 43. The work clutch 42 is switched between an engaged state in which power from the engine 5 is transmitted to the power takeoff shaft 12 and a disengaged state in which power transmission from the engine 5 to the power takeoff shaft 12 is cut.

Motor Generators, Inverters

As shown in FIG. 4, the first motor generator 17 and the second motor generator 18 are provided laterally to each other in the width direction of the vehicle body inside the transmission case 13. The first motor generator 17 is disposed on the left of the second motor generator 18. Note that the first motor generator 17 and the second motor generator 18 may also be disposed in the front-rear direction of the vehicle body.

As shown in FIG. 3, two inverters 21A and 21B are disposed. The first inverter 21A is connected to the first motor generator 17, and the second inverter 21B is connected to the second motor generator 18. The battery 22 is connected to both the first inverter 21A and the second inverter 21B. The first inverter 21A converts AC power from the first motor generator 17 into DC power and supplies the DC power to the battery 22. The second inverter 21B converts DC power from the battery 22 into AC power and supplies the AC power to the second motor generator 18. It is possible to provide batteries 22 that are separately connected to the first inverter 21A and the second inverter 21B.

As shown in FIGS. 1, 2, 4, 5 and 6, the first inverter 21A is located between the front wheels 1 and the rear wheels 2, laterally on the left side relative to the travel power transmission device 15 within the space downward of the floor section 11 of the driving section 9, and the second inverter 21B is located between the front wheels 1 and the rear wheels 2, laterally on the right side relative to the travel power transmission device 15 within the space downward of the floor section 11 of the driving section 9. Maintenance of both the first inverter 21A and the second inverter 21B is possible via the region between the front wheels 1 and the rear wheels 2 from laterally outward of the vehicle body. In the present embodiment, the first inverter 21A is provided laterally on the left side relative to the travel power transmission device 15, and the second inverter 21B is provided laterally on the right side relative to the travel power transmission device 15, but alternatively it is possible for the first inverter 21A to be provided laterally on the right side relative to the travel power transmission device 15, and for the second inverter 21B to be provided laterally on the left side relative to the travel power transmission device 15. In the present embodiment, the inverter 21A on the left side of the vehicle body out of the two inverters 21A and 21B is connected to the motor generator 17 on the left side of the vehicle body out of the two motor generators 17 and 18, and the inverter 21B on the right side of the vehicle body out of the two inverters 21A and 21B is connected to the motor generator 18 on the right side of the vehicle body out of the two motor generators 17 and 18, but it is possible to adopt a connection structure that connects the inverter 21A on the left side of the vehicle body out of the two inverters 21A and 21B to the motor generator 18 on the right side of the vehicle body out of the two motor generators 17 and 18, and connects the inverter 21B on the right side of the vehicle body out of the two inverters 21A and 21B to the motor generator 17 on the left side of the vehicle body out of the two motor generators 17 and 18.

As shown in FIGS. 1 and 2, the first inverter 21A, the second inverter 21B, the first motor generator 17 and the second motor generator 18 are located at positions corresponding to each other in the front-rear direction of the vehicle body. The first inverter 21A is near the first motor generator 17, and the second inverter 21B is near the second motor generator 18.

As shown in FIG. 4, the first inverter 21A is supported by a first support member 54 spanning from the first inverter 21A to the transmission case 13, and is supported by the transmission case 13 via the first support member 54. The second inverter 21B is supported by a second support member 55 spanning from the second inverter 21B to the transmission case 13, and is supported by the transmission case 13 via the second support member 55.

Other Embodiments (1) In the above-described embodiment, the two motor generators (electric motors) 17 and 18 are provided, but only one motor generator (electric motor) or three or more motor generators (electric motors) may be provided.

(2) In the above-described embodiment, the travel power transmission device 15 includes the transmission case 13 and the hybrid transmission 16 provided inside the transmission case 13, but the present invention is not limited thereto, and the travel power transmission device may be constituted by only a rotation shaft that transmits power to the rear wheels 2. Also, in the above-described embodiment, the hybrid transmission 16 is provided, but the present invention is not limited thereto, and an engine may be omitted, and a transmission that transmits only the drive power of an electric motor to the rear wheels 2 may be provided.

(3) In the above-described embodiment, power is transmitted to the front wheels 1 and the rear wheels 2, but power may be transmitted to only the rear wheels 2 and not to the front wheels 1.

(4) In the above-described embodiment, the rear wheels 2 are provided as the rear travel device, but a mini crawler travel device may be provided as the rear travel device.

(5) In the above-described embodiment, the two motor generators 17 and 18 have corresponding outer diameters, but the two motor generators 17 and 18 may have different outer diameters.

(6) In the above-described embodiment, both the first and second inverters 21A and 21B and both the first and second motor generators 17 and 18 are located at positions corresponding to each other in the front-rear direction of the vehicle body, but may be located in different positions in the front-rear direction of the vehicle body.

(7) The present invention is applicable to a work vehicle equipped with an electric motor coupled to a transmission that outputs power to the rear wheels (rear travel device).

What is claimed is:

1. A work vehicle comprising:
a front wheel;
a rear travel device;
a travel body supported by the front wheel and the rear travel device;
a driving section provided in the travel body and having an occupant floor section;
a travel power transmission device configured to transmit power to the rear travel device;
at least one electric motor coupled to the travel power transmission device;
a first inverter connected to the at least one electric motor; and
a second inverter connected to the at least one electric motor,
wherein:
the first inverter is provided between the front wheel and the rear travel device, on a first side in a width direction of a vehicle body of the work vehicle relative to the travel power transmission device within a space downward of the floor section, and
the second inverter is provided between the front wheel and the rear travel device, on a second side in the width direction of the vehicle body relative to the travel power transmission device within the space downward of the floor section.

2. The work vehicle according to claim 1, wherein:
the travel power transmission device includes a transmission case and a transmission provided inside the transmission case.

3. The work vehicle according to claim 1, wherein:
the at least one electric motor includes a first electric motor and a second electric motor,
the first electric motor is connected to the first inverter, and
the second electric motor is connected to the second inverter.

4. The work vehicle according to claim 2, wherein:
the at least one electric motor includes a first electric motor and a second electric motor, and
the first electric motor and the second electric motor are provided inside the transmission case, with the first electric motor, the second electric motor, the first inverter and the second inverter located at positions corresponding to each other in a front-rear direction of the vehicle body.

5. The work vehicle according to claim 4, wherein:
the first electric motor and the second electric motor are arranged laterally to each other in the width direction of the vehicle body.

6. The work vehicle according to claim 4, further comprising:
a first support member spanning from the first inverter to the transmission case and supporting the first inverter; and
a second support member spanning from the second inverter to the transmission case and supporting the second inverter.

* * * * *